United States Patent [19]

Gordon

[11] 4,423,956

[45] Jan. 3, 1984

[54] VAPOR DEPOSIT CONTACT PRINTING METHOD AND APPARATUS

[75] Inventor: Robert A. Gordon, Rochester, N.Y.

[73] Assignee: Eastman Kodak Company, Rochester, N.Y.

[21] Appl. No.: 487,994

[22] Filed: Apr. 26, 1983

Related U.S. Application Data

[63] Continuation-in-part of Ser. No. 238,778, Feb. 27, 1981.

[51] Int. Cl.³ .............................................. G03B 27/10
[52] U.S. Cl. ...................................... 355/110; 355/77; 355/30; 355/52; 118/718
[58] Field of Search ........................ 352/222; 354/325; 355/30, 52, 77, 110; 118/718

[56] References Cited

U.S. PATENT DOCUMENTS

| | | | |
|---|---|---|---|
| 1,250,894 | 12/1917 | Kately et al. | 118/718 |
| 1,381,840 | 6/1921 | Jeapes . | |
| 1,725,944 | 8/1929 | Thompson . | |
| 1,828,364 | 10/1931 | Garbutt . | |
| 2,037,806 | 4/1936 | Little . | |
| 2,408,310 | 9/1946 | Hassler . | |
| 2,552,255 | 5/1951 | Capstaff . | |
| 2,747,478 | 5/1956 | Capstaff et al. . | |
| 2,890,621 | 6/1959 | Suits | 352/222 |
| 2,983,250 | 5/1961 | Godfrey | 354/325 |
| 3,262,381 | 7/1966 | Zimmerman . | |
| 3,468,606 | 9/1969 | Wolf et al. . | |
| 3,488,121 | 1/1970 | Dassonville . | |
| 3,614,223 | 10/1971 | Ott . | |
| 3,664,738 | 5/1972 | Cameron . | |
| 3,669,720 | 6/1972 | Remer . | |
| 3,853,400 | 12/1974 | Hosaka . | |
| 4,105,329 | 8/1978 | Carter et al. . | |
| 4,173,407 | 11/1979 | Kuehnle . | |
| 4,201,581 | 5/1980 | Thomas et al. . | |

FOREIGN PATENT DOCUMENTS 1564968 4/1980 United Kingdom .

*Primary Examiner*—Monroe H. Hayes
*Attorney, Agent, or Firm*—Dennis R. Arndt

[57] ABSTRACT

Apparatus and method for contact printing which comprises moving a photographic image-bearing web and a photosensitive web in close contact, and at substantially uniform speed past an exposure position in which the photosensitive web is exposed to light that passes through the transparency web. A vapor generator is provided with its output connected to a nozzle which injects vapors at the nip formed by the two intersecting webs in advance of the exposure position such that a micro-thin layer of condensation is provided between the webs so that intimate contact is established between the webs at the time they are brought together in a film gate at the exposure position.

9 Claims, 4 Drawing Figures

VAPOR DEPOSIT CONTACT PRINTING METHOD AND APPARATUS

This is a continuation-in-part of copending U.S. Pat. application Ser. No. 238,778, filed Feb. 27, 1981 in the name of Applicant.

BACKGROUND OF THE INVENTION

1. Field of the Invention

This invention relates to a method and apparatus for continuous photographic contact printing and, more particularly, to a method and apparatus for obtaining intimate contact between a master or original film and a photosensitive duplicating film, and to apparatus for carrying out the method.

DESCRIPTION OF THE PRIOR ART

While high quality clean prints may be expected from new negatives when contact or projection printers are used, considerable difficulties are encountered if a negative is scratched or carries dirt particles.

It has been known in the prior art that if a scratched surface of a film is coated with a liquid having the proper refractive index (close to the refractive index of the support and emulsion of the negative), the scratches become practically imperceptible and are not reproduced on the positive print.

Heretofore, two distinct types of apparatus have been used to apply liquid to the film surfaces. The first such apparatus is commonly referred to as a wet printer, while the second apparatus is commonly referred to as a liquid gate printer. While both of these prior art apparatus have served the purpose, they have not proven entirely satisfactory under all conditions of service in that considerable difficulty has been experienced in applying a consistent amount of liquid to the film as the film speed varies. In both forms of the wet printers described, as the film speed increases, less liquid is applied to the surface of the film. In the liquid gate printers, if the film moves too rapidly, currents and eddies are produced in the body of liquid placed on the film surface resulting in distortion of the image to be printed.

Another problem encountered with such prior art apparatus is that during the printing operation, Newton's rings can form between the surface of the negative and the glass surface in the gate or between the two film surfaces. These rings are the result of optical interference and occur when the separation between the surfaces is of the same order as the wavelength of the exposure light. They are seen around the areas where two transparent surfaces are not quite in contact. The Newton rings result in alternate light and dark bands on the print.

Also, when a prior art printer is used in a confined space, the fumes and vapors which result from the drying of the films after they are contact printed can be excessive and may be harmful to personnel working around such equipment unless elaborate ventilation and filtration equipment is employed, which entails considerable expense.

SUMMARY OF THE INVENTION

Quite surprisingly, it has been found that satisfactory results can be obtained in contact printing of films by directing a high vapor content gas at the nip between the films just prior to their being brought together for the printing operation. In accordance with the present invention, a method and apparatus are provided for obtaining intimate contact between an original film and a photosensitive duplicating film without applying large quantities of liquid to the surfaces of the films.

It will be readily recognized that the concepts of the present invention are applicable to various types of apparatus, such as projection printers or motion picture projectors, wherein it is desirable to establish intimate contact between surfaces of a film or web. Similarly, it will be recognized that the present invention may be used with all types of film such as motion picture film, x-ray film, and microfilm. For the purposes of describing the present invention, however, the invention will be described in its application to a contact printer.

It is, accordingly, the principal object of the invention to render film surface blemishes substantially invisible at the time of making reproductions of the image carried by the film, as well as to suppress or eliminate Newton's rings and control surface static which may attract dust particles and other artifacts.

The use of vapor contact printing methods and apparatus allows a conventional drum-type contact printer with the addition of several well known components associated with electrophotographic systems to create a duplicate on an electrophotographic web or film material (e.g. so called photoconductive (PC) film) from an original silver halide (AgH) or photoconductive (PC) film.

The various features of novelty which characterize the present invention are pointed out with particularity in the claims annexed to and forming a part of the specification. For a better understanding of the invention, its operating advantages and the specific objects obtained by its use, reference should be made to the accompanying drawings and descriptive matter in which the preferred embodiment of the present invention is illustrated and described.

DESCRIPTION OF THE DRAWINGS

In the detailed description of a preferred embodiment of the invention presented below, reference is made to the accompanying drawings, in which.

DESCRIPTION OF THE PREFERRED EMBODIMENT

Because photographic printing apparatus such as continuous contact printers and projection printers are well known, the present description will be directed in particular to elements forming part of, or cooperating more directly with, apparatus in accordance with the present invention. It is to be understood that printer elements not specifically shown or described may take various forms well known to those having skill in this art.

Figure 1:
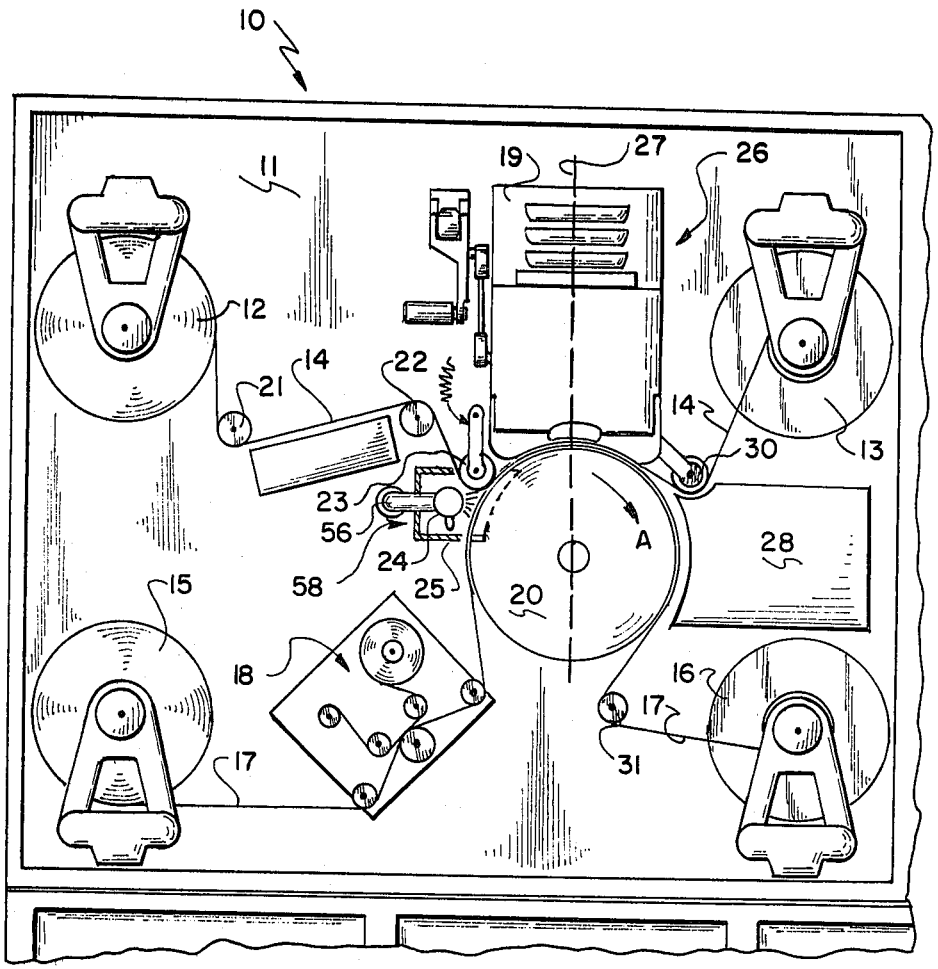
FIG. 1 is a diagrammatic elevational view of printing apparatus incorporating the novel features of the present invention.

FIG. 1 illustrates a typical layout for a drum type contact printer 10. Mounted on a suitable frame 11 are respective supply and take-up reels 12 and 13 that hold the master strip of film 14 moving therebetween. Also mounted on frame 11 are supply and take-up reels 15 and 16 respectively, between which unexposed duplicating film 17 is transported. As will be apparent from the description below, the films are transported from the supply spools 12 and 15 in such a manner as to maintain the films out of contact with each other until just prior to reaching the exposure position.

The print master or master strip of film 14 has an image thereon and for the sake of clarity, will be referred to as the original film. It should be understood that the film image can be either a positive image or a negative image.

After the duplicating film 17 comes off the supply reel 15, it is directed through a film cleaning device 18 and then onto a cylindrical print drum 20.

The original film, after passing over idler rollers 21 and 22, is brought into overlapping contact with the duplicating film 17 by pressure roller 23.

The photosensitive duplicating film 17 is wrapped about a substantial portion of the periphery of the print drum 20. The original film 14 laps over part of the photosensitive duplicating film 17 and conforms to an adequate portion of the print drum to insure that no slippage will occur at the film interfaces. The print drum 20 is rotated in a clockwise direction, indicated by arrow "A", by means of a DC motor (not shown), so as to pull the two films 14 and 17 through the print station at a uniform speed.

A vapor dispensing manifold 24 is located adjacent the nip of the pressure roller 23 and print drum 20. The manifold 24 disperses hot vapors onto the opposed surfaces of the original film 14 and duplicating film 17. Because the surface temperatures of the film surfaces are at room temperature, the vapors condense. This is because the film surfaces are lower in temperature than the dew point of the vapor. When the two films are laminated at the nip of the pressure roller 23 and print drum 20, the condensed vapors are spread out by the pressure roller 23 in a uniform micro-thin layer. This liquid fills the microscopic gaps in the film surfaces caused by scratches and other artifacts. It also fills the voids between the films caused by the normal microscopically irregular surfaces on the two films. The vapor should be dispersed as close to the pressure roller 23 as possible to assure that a minimal amount of liquid is re-evaporated before the two films are laminated between the drum and pressure roller. By chosing a liquid with the appropriate index of refraction, "evanescent coupling" will occur when the space between the confronting film surfaces is completely filled with a liquid having approximately the same index of refraction as the film material, thereby eliminating the surface reflections which cause the Newton's ring printing artifact.

An exhaust hood 25 is provided at the vapor application position to capture the "overspray" from the manifold 24.

As the print drum 20 continues to rotate, the overlapping laminated films pass under an exposure apparatus 26, which includes a lamphouse 19, which provides the exposure light and appropriate filtration to adjust the intensity level and spectral characteristics of the exposure light, as well as the required optical system for shaping the beam (not shown in detail). As the films cross the optical axis 27 of the exposure apparatus 26, light is caused to pass through the original film 14 and expose the unexposed duplicating film 17, thereby duplicating the image from the original film 14 onto the duplicating film 17. When the laminated films with the liquid interface are exposed for printing, the light passes through both films with a minimum of reflection at the film surfaces, resulting in a suppression of the adverse effects created by scratches and dirt and the elimination of Newton's rings.

It will be apparent to those skilled in the art that the printing beam may be controlled by means of a number of known shutter mechanisms so that the beam will operate in synchronism with the movement of the films.

After exposure, the films are separated, and the condensed vapor is allowed to evaporate from the film surfaces as they pass by an exhaust air dryer 28 which captures and exhausts to the atmosphere or recovery apparatus the evaporating liquid as it is released upon separation of the films.

After the films have been separated, the original film 14 is trained over an idler roller 30 before being wound on take-up reel 13. Similarly, the duplicating film 17 is passed over idler roller 31 and then wound on take-up reel 16.

It should be understood that since the duplicating film is light sensitive, the entire contact printing process described must be performed in the absence of light. This is accomplished by placing a light-tight cover (not shown) over the components shown in FIG. 1. After the exposure operation and the images of the original film have been photographed onto the duplicating film, it is still necessary that the duplicating film be handled in the absence of light until processing of the film has been completed.

Figure 2:
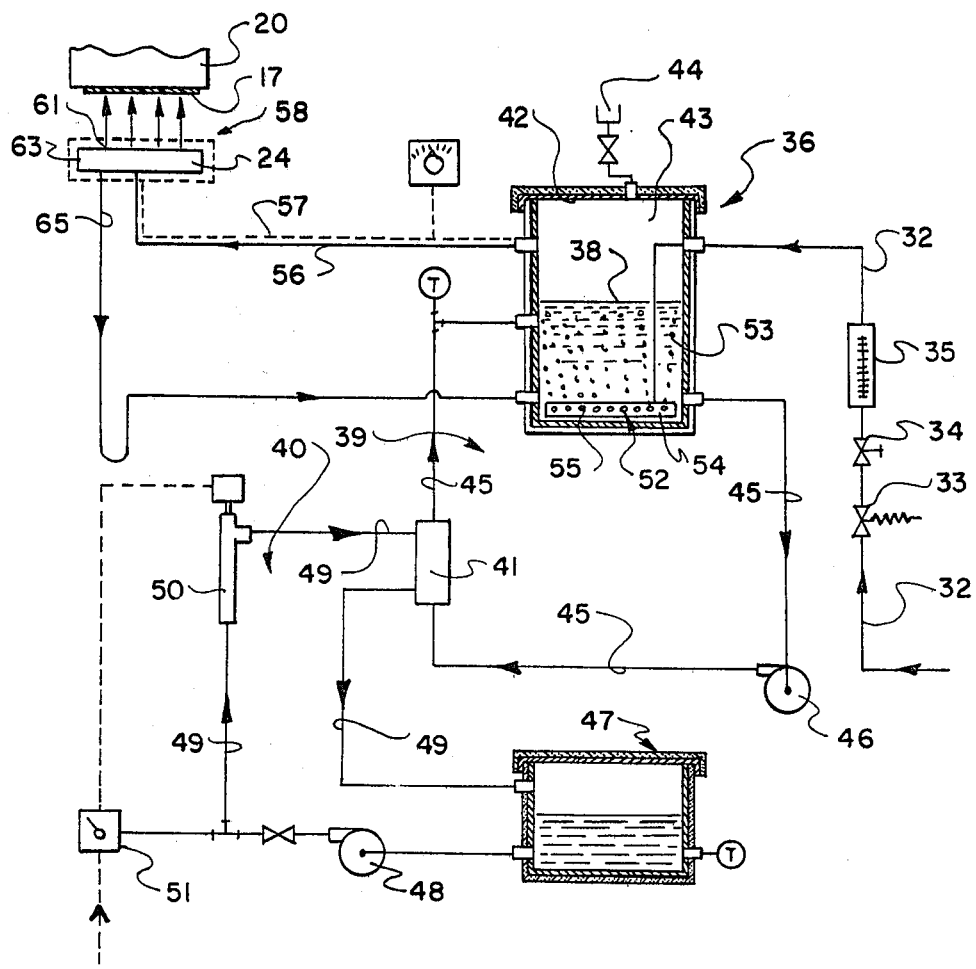
FIG. 2 is a diagrammatic, cross-sectional side elevational view of a vapor generator for use in the apparatus and method of the present invention.

Referring to FIG. 2, a vapor generator is illustrated and includes a pipe or conduit 32 which carries a filtered supply of gas such as nitrogen or air under a line pressure of 5 to 10 psi. Gas flow is controlled by a solenoid valve 33 and the pressure of the incoming gas is controlled by a pressure regulator 34 to a pressure less than the line pressure, preferably between 0.25 and 3 psi. A pressure gauge 35 is used in conjunction with the pressure regulator to monitor the pressure.

The portion of the pipe 32 containing the regulated pressure is passed through a wall of a vaporization chamber 36 partially filled with a liquid 38 to be vaporized, such as ethyl alcohol.

To further enhance vaporization, the liquid is heated. Heating may be done by any of many conventional methods, if non-flammable liquids are used. However, when dealing with flammable liquids, open flames or sparks should be avoided. Thus, it is preferred that a tempered water heating system be used with flammable liquids such as ethyl alcohol.

Such a heating system is comprised of two pipe loops, an alcohol loop 39 and a water loop 40, each of which passes through a common heat exchanger 41.

The ethyl alcohol loop 39 comprises an air-tight, well insulated ten-gallon stainless steel vaporization chamber 36. The top 42 of the chamber 36 is removable for cleaning the interior of the chamber 43. The top 42 also has a fillport 44 which allows for replenishing liquid in the vaporization chamber 36. The liquid ethyl alcohol is circulated through piping 45 by a one-to-three-gallon per minute centrifugal pump 46, which results in the alcohol being heated by the water as it passes through heat exchanger 41 on its way back to the vaporization chamber 36.

The water loop 40 includes a five-gallon stainless steel tank 47 which is well insulated and acts as a water reservoir. In a manner similar to the first loop, a small centrifugal-type circulation pump 48 (one-to-three gallons per minute) circulates a portion of the water in the tank 47 through pipe 49 to an immersion type heater 50 which is thermostatically controlled by thermostat 51, which maintains the water at a predetermined temperature. The tempered water also passes through heat exchanger 41 where heat from the water is transferred to the alcohol as the alcohol is piped through the common heat exchanger 41.

The compressed gas, as mentioned earlier, is metered into the vaporization chamber 36 through an aspirator tube 52 positioned near the bottom of the chamber 36, resulting in dispersement of the gas into small bubbles 53 at a rate of 1 to 2 SCFM (standard cubic feet per minute). The aspirator 52 comprises a ½ inch circular copper tube 54 with approximately forty (40) 1/16 inch-in-diameter holes 55 equally spaced along its length. A porous cylinder could be used, but that the copper tube produces a greater number of bubbles and of more uniform size. As the bubbles 53 percolate through the liquid 38 toward the surface, the bubbles 53 increase the vaporization rate of the alcohol by providing agitation of the liquid 38 as well as increasing the surface area of the liquid, with the vaporization rate being directly proportional to the surface area of the liquid.

Figure 3:
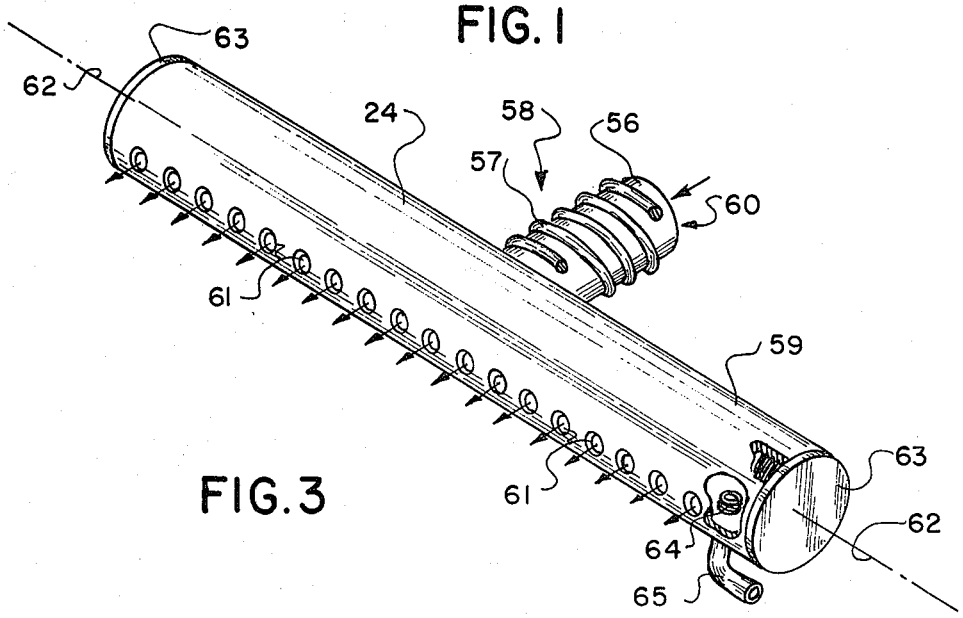
FIG. 3 is a perspective view of a manifold used to disperse vapor onto the surfaces of the film in practicing the apparatus and method of the invention.

Referring to FIGS. 2 and 3, the vaporized alcohol is piped through a metal hose 56 heated by electrical heater tape 57 wrapped about the length of the hose 56 leading to a manifold nozzle assembly 58. This is done to prevent condensation of the vapors in the hose 56 and to help maintain the alcohol vapor at about 46° C.

The manifold 58 is designed to provide uniform distribution of vapor from one end to the other. The manifold is cylindrical in shape and fabricated from a 1½ inch stainless steel pipe 59. The vapor enters through a central opening 60 in the side of the pipe, thereby immediately reducing the velocity head of the vapor flow to provide a more even static pressure distribution across the manifold 58. This uniform static pressure distribution results in more uniform vapor discharge through thirty-six discharge holes 61 in the manifold 58, each of which is 3/32 inch in diameter. The vapor is discharged through these holes at right angles to the longitudinal axis 62 of the manifold. The total open area of the discharge holes 61 is 0.255 square inches, which is approximately 15% of the cross-sectional area of the metal supply hose 56. This restriction is needed to give a uniform vapor distribution across the manifold 58. The greater the restriction, the more uniform the distribution. The ends of the manifold 58 are threaded to accommodate a standard pipe cap 63 so that access to the inside of the manifold is made possible when the end caps are removed, thereby allowing for cleaning, repair and modifications. In addition, an opening into which a ¼ inch pipe 65 may be threaded at the lowest point on the manifold, and provides for removal of condensate in the manifold 58 and returns condensate to the vaporization chamber 36.

During normal operation, both recirculation pumps 46 and 48 as well as the temperature control components operate continuously to maintain constant temperature. The compressed air and vapor generation supply is activated only when the films are being transported. This is accomplished by the action of a solenoid valve 33 in the air supply line 32, which is automatically opened when the print drum 20 starts rotating. This is done to prevent build-up of condensed vapor on the print drum 20 while the printer 10 is not transporting film.

It has been determined that when film is being transported at the rate of 100 FPM (feet per minute), optimal conditions of the other parameters are: water temperature 62°–66° C., air flow 1–2 SCFM, with liquid usage being approximately 30–40 ml/min. (milliliters per minute).

As indicated above, the liquid employed to render the blemishes invisible should have an index of refraction approximating that of the film emulsion. In addition to having an index of refraction that approximates that of the contacting film surfaces, other characteristics of the liquid that must be considered are volatility and toxicity, as well as compatibility with the films.

Another desirable property of the liquid is that it must "wet" the contacting surfaces of the films. By "wetting" the surface, it is meant that the liquid uniformly covers the surface and does not leave open areas of the surface exposed. This deposition of vapor takes place regardless of the character or composition of the receiving surface, providing the proper atmospheric and temperature conditions exist.

While the above discussion regarding the properties of liquids useful in the practice of the invention is sufficient to enable one skilled in the art to select a liquid or liquids suitable for a particular application, it is convenient to consider some specific examples of liquids which have been found to give satisfactory results.

The refractive index, flash point and auto ignition temperature are listed below for four liquids that have given satisfactory results.

| Material | Refractive Index | Flash Point (°C.) TCC ASTM-D56 | Auto Ignition Temperature (°C.) ASTM-D286 |
| --- | --- | --- | --- |
| Water | 1.33 | — | — |
| Ethyl Alcohol | 1.36 | 13 | 423 |
| ISOPAR G* | 1.43 | 41 | 293 |
| FREON 113** | 1.35 | — | — |

*ISOPAR G is a trademark for the Humble Oil & Refining Company, and is a narrow-cut isoparaffinic hydrocarbon fraction with an extremely high level of purity. Boiling range is approximately 156–176° C. (313–348° F.). Like all ISOPAR grades, it is synthesized by a modern catalytic refining process from selected petroleum fractions.
**FREON 113 is a DuPont deNemours and Company trademark for 1,1,2-Trichloro 1,2,2 Trifluoroethane.

Evanescent coupling is defined as completely filling the space between the confronting film surfaces with a liquid having approximately the same index of refraction as the film material. This eliminates the formation of Newton's rings by causing the opposing surfaces of the film to "evanesce", i.e. disappear.

Use of FREON 113 eliminates the danger associated with flammable liquids and therefore does not require the tempered water heating system. FREON 113 may be heated directly to within a temperature range of 38° C. to 48° C., which is the preferred temperature for vaporization. FREON 113 is more costly to use than water but has the advantage that prolonged use will not damage the original film as water sometimes can. Water has a tendency to be absorbed by the gelatin layer on the original film and may deteriorate the gelatin if the film is exposed to the water for an extended length of time, e.g., if a number of duplicates are made from a single original in a short period of time.

It can also be seen that use of the present invention substantially reduces the leakage into the work environment of vapors which might otherwise cause a health hazard. The exhaust hood 25 and exhaust air dryer 28 at the input and output sides respectively of the printer drum prevent leakage of vapors, into the working space around the printer. Vapor deposit printing also reduces substantially the amount of liquid used, which in turn reduces the cost.

Figure 4:
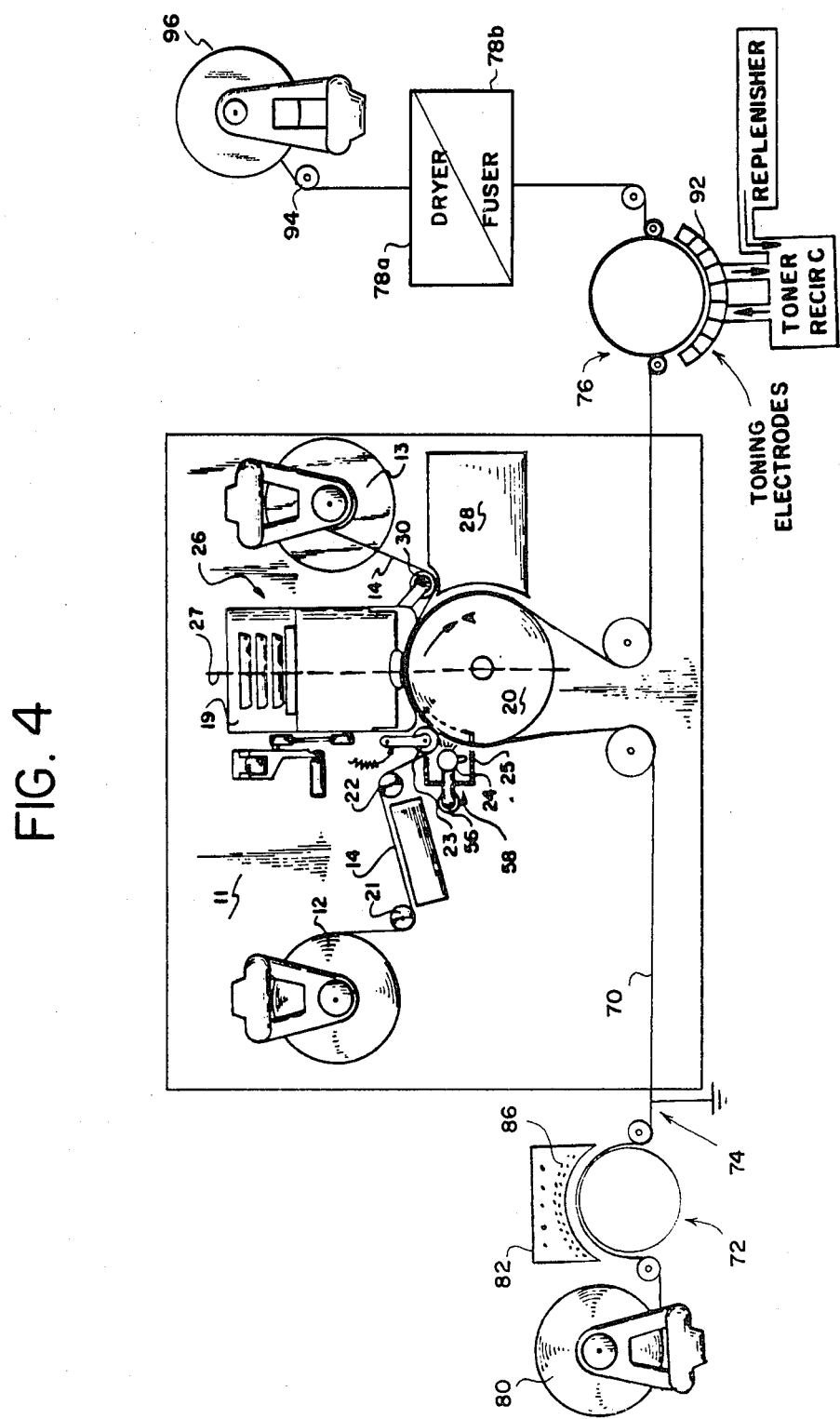
FIG. 4 is a diagrammatic elevational view of a modified form of the invention.

FIG. 4 illustrates a further embodiment of the invention in which the basic vapor deposit contact printing apparatus shown in FIG. 1, with the addition of several well known components associated with electrophotographic systems, may be used to duplicate an original silver halide (AgH) film on electrophotographic web or film 70. The additional components would include the following: a charging station 72, grounding station 74, developing station 90, and a dryer/fusing station 78a, 78b.

Broadly speaking, the electrophotographic process consists of the formation of an electrostatic image on the surface of a photoconductive insulating material by first placing a charge on the surface and then discharging it when an image-forming light pattern strikes the surface. The action of the light produces conductivity in the otherwise insulating material. The latent image is then made visible by electrically charged toner particles, dispersed in a liquid carrier, which are attracted to it.

The electrophotographic web or film materials are produced by first coating a clear, conducting layer onto an appropriate support web or film, e.g. a tough, durable polyester support approximately 4 mils in thickness. This conducting layer acts as a ground electrode during the process. On top of this layer, a photoconductive layer is coated. The purpose of this layer is to accept and hold an electrostatic charge in the dark, and to then discharge in areas which are struck by an exposing light beam. The photoconductive layer is a solid solution of a suitably sensitized organic photoconductor. This is a homogenous layer, without any of the crystalline structure associated with the emulsion layer of silver-halide photographic materials. The photoconductive layer of the film is normally charged to about +600 volts.

The original film 14, either silver halide (AgH) or photoconductive (PC) will be handled and transported in exactly the same manner as previously described. However, the path of the duplicating PC film 70 would have to be altered to allow for the incorporation of the additional components needed to accommodate the electrophotographic web or film materials along the film path.

The photoconductive film 70 is supplied from a suitable reel 80. The photoconductive film 70 is first charged by a charging station 72 where a corona charger 82 is used to sensitize the film 70 by placing a positive charge on the surface of the film just prior to the image exposure. There are a number of ways of generating this charge, but the corona charger 82 is recommended because it produces a uniform, easily controlled charge level. A uniform film voltage is one of the requirements in the electrophotographic process. Uneven charging can result in uneven development and can even lead to loss of image information. A corona is essentially a field of ionized air which is created between a wire and another conducting surface when a sufficiently high voltage is applied across them. The charging operation is carried on in the dark or under the appropriate safelight conditions for the film being used because the film becomes sensitive to light during this step. A corona charger 82 can take many forms, such as a single-wire charger, an AC corona charger or a grid-controlled charger. The grid-controlled corona charger is preferred because it offers precise control of the charging operation. The voltage at which the control grid 86 is set depends on the desired surface voltage on the photoconductor and on the speed at which the film 70 passes under the charger.

The grid-controlled charger 82 produces a quantity of positively charged ions which are attracted to the film surface. The charging circuit is completed by grounding the conducting layer of the film. Grounding the conducting layer attracts the positive ions to the surface of the film as negative counter chargers flow into the conducting layer. This grounding of the conducting layer may be accomplished by "end grounding" which is a grounding of the film 70 to the metal supply reel 80 via a conducting lacquer, or it may be done at a separate grounding station 74 which may be positioned along the film path intermediate the corona charger 82 and exposure apparatus 26. Such a device is described in U.S. Pat. No. 3,650,622.

The vapor dispensing manifold 24 is located adjacent the nip of the pressure roller 23 and print drum 20. The manifold 24 as discussed earlier, disperses hot vapors onto the opposed surfaces of the original film 14 and duplicating film 70. The condensed vapors are spread out by the pressure roller 23 in a uniform micro-thin layer, thereby producing the desired optical index match and the requisite electrical insulation. In practice it has been found that the liquid ISOPAR G has worked satisfactorily with photoconductive (PC) type duplicating films 70.

The exposure apparatus 26 is the same as that described earlier. When exposing photoconductive (PC) film materials, light from the lamp house 19 after passing through the image on the original film, strikes the charged, photoconductive layer of the photoconductive film; the light thus produces conductivity wherever it strikes. The light produces positive and negative charges which migrate through the photoconductive layer and discharge both the surface layer and conducting layer charges in a pattern that corresponds to the image. The areas not struck by the exposing light remain with their respective charges intact. After the exposure has been made, the two films are separated; the original film 14 is trained over idler roller 30 before being wound on take-up reel 13. The duplicating PC film 70, passes by exhaust air dryer 28 which captures and exhausts to the atmosphere or recovery apparatus the evaporating liquid from the surface of the film. The film 70 is then directed to the developing station 76, the purpose of which is to bring the exposed film into contact with a liquid developer. Toner particles in the liquid developer are positively charged and are suspended in an insulating liquid. The toner particles are attracted by the electrical field of the latent image. The development process takes place rapidly, at normal transport speeds, because only one to four seconds are required for development.

In order to develop an even high density across images of widths greater than ⅛inch or so, "toning electrodes 92" are incorporated in the developer station 76. The toning electrodes 92 are connected to a power supply (not shown) which provides a positive charge of sufficient intensity so that external field lines are produced in the space between the film 70 and the toning electrodes 92. As a result, the positively charged toner particles will be attracted along these lines, producing an even density distribution across a wider image area.

Once the toner particles have been deposited on the surface of the photoconductive film 70, the image should be air-dryed. Thus, the use of a dryer station 78a is necessary to prevent the image from smearing before it is made permanent. Also, if the image is brought out into light it may become fuzzy. This fuzziness occurs because the toner particles are held on the surface of the film 70 by the film charge. The charge will dissipate if it is exposed to any light to which the film is sensitive, thus releasing the toner. After drying is completed, however, the toner will stay in place.

Even at low processing speeds, some developer is carried away by the PC film during transport through the dryer station 78a. Drying for one to two seconds at 82° C. (180° F.) is sufficient to dry the duplicated image. Drying air that is too warm, however, may cause the image to become fuzzy because photoconductive (PC) film will also discharge when heated. Use of a simple air-knife or the use of a fan designed to blow cool air across the surface of the film has been found to be very effective. Removal of excess developer at this point also aids in preventing drying spots on the PC material after it leaves the fusing station 78b. At higher speeds, a vacuum return for the developer may be necessary in addition to the air-knife.

Once the image has been dried on the surface of the photoconductive film 70, it simply remains to add heat to melt or fuse the toner particles together to form a permanent image. This is accomplished in the fusing station 78b, where the toner also melts slightly into, and fuses with, the material of the photoconductive layer, thereby adding to the durability of the finished image.

The main requirement of the fusing station 78b is to provide the required amount of heat to soften the toner particles, without providing excessive heat which would result in deformation of the PC film surface or even the base itself. Workable fusing temperatures range from 82° C. and 93° C. (180° F. and 200° F.). There are a number of ways of supplying heat required for fusing, such as: a film driven fusing roller heated by an axially mounted quartz infrared lamp, air heated as it is blown over thermostatically controlled heating coils or by using IR radiation, which is excellent for dense line images. The black toner particles readily absorb the radiant energy, and fusing takes place quickly. However, control of the heat in this method is more difficult and some form of feedback is needed for accurate temperature control.

After fusing takes place, the duplicating photoconductive film 70 is passed over idler roller 94 and is then wound on take-up reel 96.

It is intended that the term "photographic material" include different types of photosensitive materials or processes, e.g. silver halide (AgH) and photoconductive (PC) films. Clearly, it can be seen that the vapor deposit contact printing apparatus as described above has the capability of operating to transfer images from and to various combinations of such material, e.g. AgH to AgH, AgH to PC, PC to AgH, PC to PC, etc.

When comparing the contact printing apparatus illustrated in FIG. 1 with that portion of the contact printer shown in FIG. 4, it should be noted that the film cleaning device 18 has been omitted in FIG. 4. This was done for the sake of clarity in the drawings, and is not intended to mean that a film cleaner cannot be used with photoconductive film. However, the use of a film cleaner in the duplicating film path would require that it be positioned before the charging station 72.

The apparatus illustrated in FIG. 4 is capable of handling electrophotographic film in a continuous operation and produces a fully processed duplicate film from a supply of unexposed duplicating film. Clearly, the functions performed by the additional components could be performed at remote locations (e.g. charging, development and fusing). If this were done, the original apparatus of FIG. 1, less the film cleaning device 18, would perform the same duplicating operation described in the description of FIG. 4. Thus, charged electrophotographic film would be supplied to the FIG. 1 apparatus for exposure, with the exposed film being removed from the printer for developing and fusing on other equipment.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. Apparatus for photographic contact printing comprising, in combination:
   means for generating a vapor;
   means for bringing together at a nip-forming station, and for transporting at substantially the same speed past an exposure position and in intimate overlying relationship, a first, photosensitive web and a second, image-bearing web;
   means at said exposure position for directing light through said second web to expose said photosensitive web; and
   means for directing said vapor, at the nip-forming station for providing a thin layer of vapor condensate between said webs to establish evanescent coupling between them as they pass said exposure position.

2. The apparatus set forth in claim 1 wherein said vapor condensate is water.

3. The apparatus set forth in claim 1 wherein the temperature of the vapor is between 26° C. and 45° C.

4. The apparatus set forth in claim 1 wherein said vapor condensate is selected from the group consisting of water, ethyl alcohol, ISOPAR G, and FREON 113.

5. Apparatus for printing photographic images from a first web onto a photosensitive second web, said apparatus comprising:
   an exposure station, including illuminating means;
   means for generating a vapor;
   a rotatable cylinder for supporting said webs and carrying them in close overlying contact and transporting said webs in unison in a path past said exposure station;
   means for rotating said cylinder;
   means for guiding said second web onto said rotatable cylinder to meet the surface thereof and for bringing said first web into said overlying relation with said second web on said rotatable cylinder whereby opposed surfaces of said webs form a nip;
   a nozzle adjacent the nip formed by the two webs for directing said vapor into said nip whereby evanescent coupling is established between the webs at the exposure station by a thin layer of condensed vapor.

6. The apparatus set forth in claim 5 wherein the vapor condensate has approximately the same index of refraction as said webs.

7. The apparatus set forth in claim 6 wherein said vapor condensate is selected from the group consisting of water, ethyl alcohol, ISOPAR G, and FREON 113.

8. A method of establishing intimate contact between an original web and a duplicating web while moving said webs in unison in a confronting relation past an exposure gate, said method comprising the steps of:

forming a nip between the two webs in advance of said gate; and directing into the nip a vapor that condenses on the confronting surfaces of the webs, said vapor condensate having approximately the same index of refraction as said webs.

9. In the method set forth in claim 8 wherein said vapor condensate is selected from the group consisting of water, ethyl alcohol, ISOPAR G, and FREON 113.

* * * * *